March 27, 1962    L. V. SMITH    3,026,551
COMBINATION LAWN SWEEPER AND INCINERATOR
Filed June 2, 1960
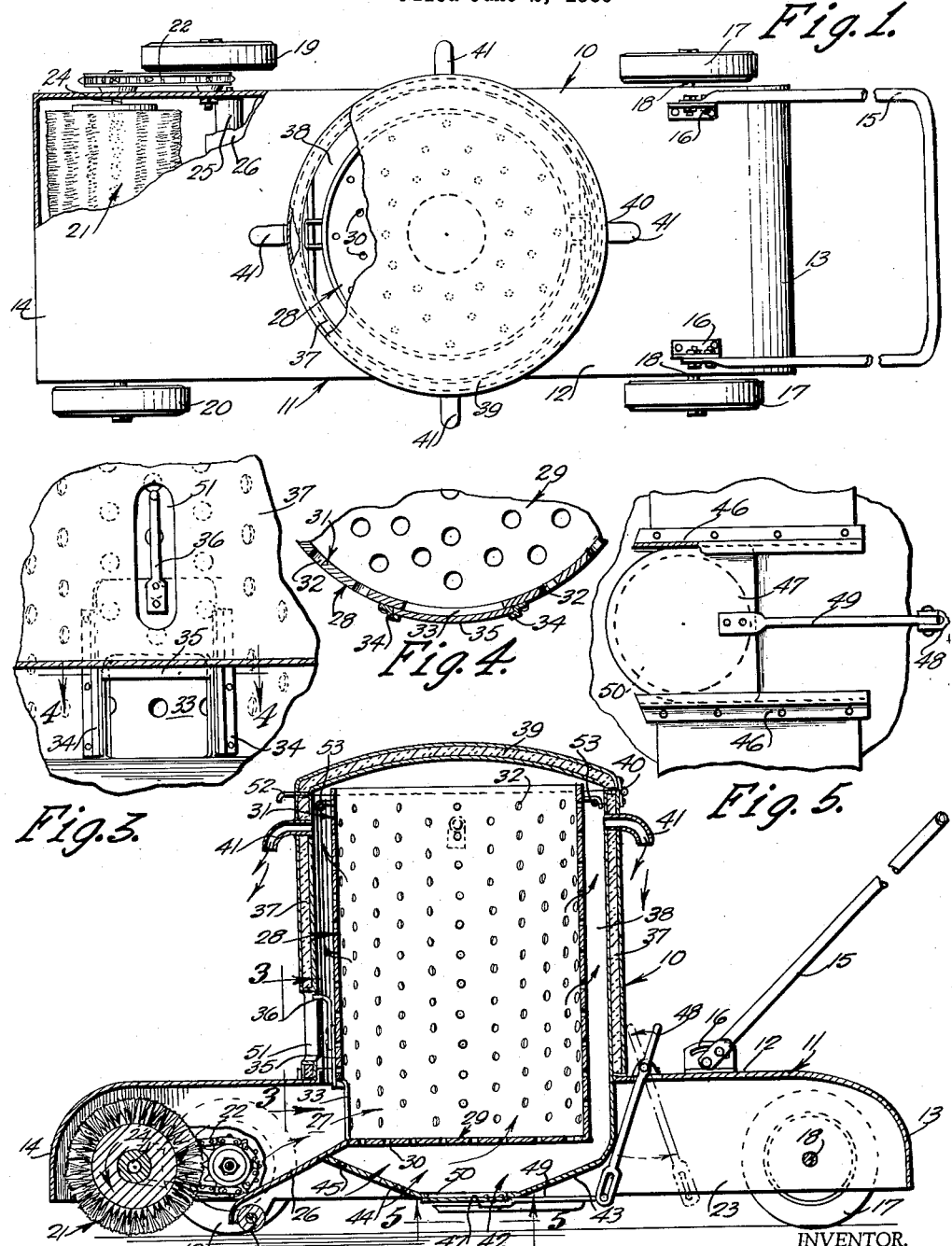
INVENTOR.
Lillian Vivian Smith
BY
Victor J. Evans & Co.
ATTORNEYS

3,026,551
COMBINATION LAWN SWEEPER AND INCINERATOR
Lillian Vivian Smith, 608 S. East St., Lebanon, Ind.
Filed June 2, 1960, Ser. No. 33,470
2 Claims. (Cl. 15—4)

This invention relates to a machine for sweeping leaves, cut grass or the like from a lawn or other area, whereby this material will be conveyed into a firebox and burned.

The object of the invention is to provide a combination lawn sweeper and incinerator which includes a member that is adapted to be moved along a lawn or other area, and wherein there is provided a rotary brush which serves to sweep up the leaves or cut grass or the like so that this material will be fed into a firebox where the material will be ignited or burned, and wherein a means is provided for supplying sufficient air to the firebox to support combustion, and wherein there is also provided a means for selectively discharging ashes from the bottom of the machine.

A still further object of the invention is to provide a combination lawn sweeper and incinerator which is adapted to be conveniently moved along a particular area such as a lawn, and wherein movable closures are provided for controlling the entrance of leaves and grass into the fire chamber or box, and wherein there is also provided a means for selectively discharging ashes from the bottom of the machine so that such ashes can be discharged at a particular location as desired.

A further object of the invention is to provide a combination lawn sweeper and incinerator which is extremely simple and inexpensive to manufacture.

Other objects and advantages will be apparent during the course of the following description.

In the accompanying drawings, forming a part of this application, and in which like numerals are used to indicate like parts throughout the same:

FIGURE 1 is a plan view of the combination lawn sweeper and incinerator of the present invention, and with parts broken away and in section.

FIGURE 2 is a vertical sectional view taken through the combination lawn sweeper and incinerator of the present invention.

FIGURE 3 is a sectional view taken on the line 3—3 of FIGURE 2.

FIGURE 4 is a sectional view taken on the line 4—4 of FIGURE 3.

FIGURE 5 is a sectional view taken on the line 5—5 of FIGURE 2.

Referring in detail to the drawings, the numeral 10 indicates the combination lawn sweeper and incinerator of the present invention and which comprises a frame or body member 11 which is shaped to include a top portion 12 as well as spaced apart end portions 13 and 14, and there is also provided vertically disposed spaced parallel side portions or walls 23. The numeral 15 indicates a handle which is connected to the top portion 12 through the medium of brackets, FIGURES 1 and 2, and such brackets are indicated by the numeral 16.

Rear wheels 17 are connected to the body member 11 as at 18, and there is also provided front wheels 19 and 20. The numeral 21 indicates a rotary brush which is mounted in the front portion of the body member 11, and the brush 21 is adapted to be rotated by a suitable mechanism such as the chain and sprocket mechanism 22 which serves to connect the shaft 24 of the brush 21 to the shaft of the wheel 19.

There is provided in the front portion of the body member 11 an inclined baffle 26 which is arranged rearwardly of the brush 21, and the numeral 27 indicates a passageway above the baffle 26. The numeral 28 indicates a firebox or ignition chamber, and the firebox 28 includes a bottom wall 29 which is provided with a plurality of apertures or openings 30 therein. The firebox 28 further includes a cylindrical side wall 31 which has a plurality of spaced apart apertures 32, and the upper end of the firebox 28 is open.

There is provided in the lower portion of the firebox 28 an opening 33 which is arranged in alignment with the passageway 27, and the numeral 35 indicates a door or closure which is adjustably mounted for movement into and out of open or closed relation with respect to the opening 33, the door 35 being mounted for sliding movement in tracks 34. A handle 36 is connected to the door 35 for raising or lowering the door, and with the door 35 in raised position, grass, leaves or the like will be swept upwardly by the brush 21 and this material will pass through the passageway 27 and then through the opening 33 and into the interior of the firebox 28 where this material can be ignited or burned.

Surrounding the firebox 28 is an insulated jacket 37, and the numeral 38 indicates the space between the jacket and firebox. A cover or lid 39 is hingedly connected to the jacket 37 by means of a hinge 40, and the cover 39 can be pivoted upwardly when desired, as for example when access is to be gained to the interior of the firebox 28. The numeral 41 indicates exhaust conduits or pipes which extend through the jacket 37 and which have their inner ends communicating with the space 38.

There is provided an ash receiver or chamber 42 below the firebox 28, and the ash receiver 42 is partially defined by wall portions 43 and 44, and the wall portion 44 is provided with openings 45 through which air can pass in order to support the combustion in the firebox 28. The bottom of the receiver 42 is provided with tracks 46 in which is slidably mounted a door or closure 47, and the closure 47 is mounted for movement into and out of opened and closed relation with respect to a discharge opening 50 in the bottom of the receiver 42. The numeral 48 indicates a lever which is connected to the closure 47 through the medium of linkage 49, so that by moving the lever 48, as for example from the solid line position shown in FIGURE 2 to the broken line position of FIGURE 2, the closure 47 can be moved in order to uncover the opening 50 whereby ashes in the chamber 42 can drop downwardly through the opening 50.

The numeral 51 indicates an opening or space in the jacket 37 which provides sufficient clearance for permitting a person to manually engage the handle 36 in order to permit up and down movement of the closure 35 by the handle 36.

From the foregoing, it is apparent that there has been provided a combination lawn sweeper and incinerator, and in use, with the parts arranged as shown in the drawings, it will be seen that the machine 10 is adapted to be pushed or moved along a lawn or other area and the handle 15 provides a convenient means for manually propelling or pushing the machine. As the machine 10 moves along the lawn, the wheels will turn since the wheels are arranged in engagement with the ground or lawn. As a wheel such as the wheel 19 turns, it turns the endless chain of the chain and sprocket mechanism 22, and this in turn rotates the shaft 24 and since the brush 21 is mounted on the shaft 24, it will be seen that this will rotate the brush 21 in a counerclockwise direction, FIGURE 2, so that leaves, cut grass or the like will be swept up by the bristles of the brush 21 and this material will pass up along the baffle 26 and will pass through the passageway 27 and then into the firebox 28 through the opening 33. The firebox 28 may be lit initially by placing a few leaves or the like in the firebox and then dropping a match therein, and it will be seen that as the machine 10 continues along a lawn, additional leaves or grass will be swept into the firebox so as to permit combustion to continue. The air for supporting combustion is supplied through the openings 45 and this air can also pass up through the openings 30 in the bottom wall 29 of the firebox. The exhaust smoke or fumes can pass out through the apertures 32 and into the space 38, and this exhaust or smoke can then pass out through the pipes 41 and be discharged into the atmosphere. The cover 39 can be pivoted on its hinge 40 as for example when the fire in the box 28 is to be initially started.

As shown in FIGURE 2, a finger engaging lug 52 may be connected to the cover 39 so that when the cover 39 is to be raised, the lug 52 can be manually gripped.

The jacket 37 is adapted to be made of a suitable insulated material and the jacket 37 is spaced from the wall 31 of the firebox 28 so as to define the space 38. The door or closure 35 can be opened or closed with respect to the opening 33 so as to control the influx of leaves or grass into the firebox. Ashes from combustion of the material pass downwardly through the apertures 30 and enter the chamber or receiver 42. When the dumping area is reached, the lever 48 can be moved and this will open the closure 47 so as to permit the ashes to pass downwardly through the discharge openings 50, and then the lever 48 can be returned to the position shown in solid lines in FIGURE 2 in order to close the member 47 with respect to the opening 50. The brush 21 is connected or mounted in such a fashion so that it will turn faster than a wheel such as the wheel 19 in order to insure that the leaves and grass will be properly swept up from the lawn.

The parts can be made of any suitable material and in different shapes or sizes.

It is to be noted that as the sweeper incinerator of the present invention is pushed in a forward direction, the brush 21 is driven and this brush may be gear driven by the front wheels. The brush is also adapted to be adjustable up or down, and the leaves, grass or the like are swept through the inlet opening 33, when the cutoff door 35 is in raised position, and this material will be received in the perforated firebox 28. The leaves can then be ignited manually. Air enters through the openings 45 and up through thte openings 30, and the smoke escapes through the handles or pipes 41, and screens may be provided on the members 41 to retain sparks.

When the ashes are being emptied, the inlet cutoff door lever 36 is lowered so as to cause the closure 35 to close off the firebox inlet 33 and then the cover 39 can be opened, and the firebox can be lifted from the insulated jacket 37. Or, the lever 48 can be used for dumping the ashes as previously stated.

The roller 25 follows the ground contour and prevents the inlet housing or member 11 from catching on the ground. The machine can be made in several different sizes, as for example a large size can be made for industrial use and a smaller size can be made for residential use.

The brush 21 is covered by the portion 14, and the parts such as the parts 26 and the adjacent portions of the body member serve to insure that the leaves will not be scattered around and wherein these elements will serve to help guide the leaves and grass into the fire basket or firebox. The leaves or grass are swept through the opening 33 directly into the perforated firebox. The closure 35 can be used as a safety cutoff member since when the closure 35 is in down position, no further material will be fed into the firebox to support combustion. The lever 48 can be actuated by the person's foot, or else the lever can be manually moved. The lever 48 is convenient to reach, and the firebox may be suspended or supported in the jacket 37 by means of lugs 53. The ports or pipes 41 serve as smoke outlet members and these ports extend out through the jacket and turn down.

Minor changes in shape, size and rearrangement of details coming within the field of invention claimed may be resorted to in actual practice, if desired.

What is claimed is:

1. In a combination lawn sweeper and incinerator, a body member including a horizontally disposed top portion, spaced parallel vertically disposed side portions, and spaced apart front and rear portions, a handle connected to said top portion, front and rear wheels connected to said body member, a rotary brush mounted in front of said body member and driven by one of said wheels, an inclined baffle positioned rearwardly of the brush, there being a passagway in said body member above said baffle, a firebox for receiving leaves, grass and the like from said passageway, said firebox including a bottom wall provided with a plurality of spaced apart apertures, said firebox further including a cylindrical side wall provided with a plurality of spaced apart apertures, the top of said firebox being open, there being an opening in the lower portion of said side wall in alignment with said passageway, a sliding closure mounted for movement into and out of open and closed relation with respect to said last named opening, a handle connected to said closure, an insulated jacket surrounding said firebox, a lid hingedly connected to the top of said jacket, exhaust pipes extending through said jacket, an ash receiver below said firebox, a movable closure for said ash receiver, and a lever for moving said last named closure.

2. In a combination lawn sweeper and incinerator, a body member including a horizontally disposed top portion, spaced parallel vertically disposed side portions, spaced apart front and rear portions, a handle connected to said top portion, front and rear wheels connected to said body member, a rotary brush mounted in front of said body member and driven by one of said wheels, an inclined baffle positioned rearwardly of the brush, there being a passageway in said body member above said baffle, a firebox for receiving leaves, grass and the like from said passageway, said firebox including a bottom wall provided with a plurality of spaced apart apertures, said firebox further including a cylindrical side wall provided with a plurality of spaced apart apertures, the top of said firebox being open, there being an opening in the lower portion of said side wall in alignment with said passageway, a sliding closure mounted for movement into and out of open and closed relation with respect to said last named opening, a handle connected to said closure, an insulated jacket surrounding said firebox, a lid hingedly connected to the top of said jacket, exhaust pipes extending through said jacket, an ash receiver below said firebox, a movable closure for said ash receiver, and a lever for moving said last named closure, and a ground engaging roller mounted in the lower portion of said body member rearwardly of said brush.

References Cited in the file of this patent

UNITED STATES PATENTS

| | | |
|---|---|---|
| 604,812 | Walton | May 31, 1898 |
| 931,741 | Emerson | Aug. 24, 1909 |